(12) United States Patent
Bröcker et al.

(10) Patent No.: US 12,085,163 B2
(45) Date of Patent: Sep. 10, 2024

(54) TRANSMISSION AND METHOD FOR OPERATING A TRANSMISSION

(71) Applicant: Flender GmbH, Bocholt (DE)

(72) Inventors: Sarah Bröcker, Bocholt (DE); Markus Degeling, Rhede (DE); Christian König, Bochum (DE)

(73) Assignee: Flender GmbH, Bocholt (DE)

( * ) Notice: Subject to any disclaimer, the term of this patent is extended or adjusted under 35 U.S.C. 154(b) by 0 days.

(21) Appl. No.: 18/273,226

(22) PCT Filed: Feb. 3, 2022

(86) PCT No.: PCT/EP2022/052520
§ 371 (c)(1),
(2) Date: Jul. 19, 2023

(87) PCT Pub. No.: WO2022/179818
PCT Pub. Date: Sep. 1, 2022

(65) Prior Publication Data
US 2024/0117873 A1    Apr. 11, 2024

(30) Foreign Application Priority Data

Feb. 26, 2021   (DE) .................... 10 2021 201 875.0

(51) Int. Cl.
*F16H 57/04*   (2010.01)

(52) U.S. Cl.
CPC ......... *F16H 57/042* (2013.01); *F16H 57/045* (2013.01); *F16H 57/0479* (2013.01); *F05B 2220/705* (2020.08); *F05B 2260/98* (2013.01)

(58) Field of Classification Search
CPC .. F16H 57/042; F16H 57/045; F16H 57/0479; F05B 2220/705; F05B 2260/98
See application file for complete search history.

(56) References Cited

U.S. PATENT DOCUMENTS

| 2011/0138963 A1* | 6/2011 | Pischel ................... F03D 15/00 |
| --- | --- | --- |
| | | 277/358 |
| 2013/0165288 A1 | 6/2013 | Dinter et al. |
| 2014/0221144 A1 | 8/2014 | Vath et al. |
| 2015/0104127 A1 | 4/2015 | Lubben et al. |
| 2017/0299044 A1 | 10/2017 | Carr et al. |
| 2022/0307481 A1* | 9/2022 | Langvardt Krogh ....................... |
| | | F16J 15/3204 |

FOREIGN PATENT DOCUMENTS

| DE | 102010060147 A1 * | 4/2012 | ............. F03D 15/00 |
| --- | --- | --- | --- |
| DE | 102011106535 | 1/2013 | |
| DE | 102015223669 | 6/2017 | |
| DE | 102019207102 | 11/2020 | |
| EP | 2 541 058 | 1/2013 | |
| WO | WO-2006043008 A1 * | 4/2006 | ........... F16H 57/043 |
| WO | WO 2011/055384 | 5/2011 | |
| WO | WO-2019022595 A1 * | 1/2019 | ............. F03D 15/10 |

OTHER PUBLICATIONS

International Search Report issued on Apr. 13, 2022 by the European Patent Office in International Application PCT/EP2022/052520.

\* cited by examiner

*Primary Examiner* — Tisha D Lewis
(74) *Attorney, Agent, or Firm* — Henry M. Feiereisen LLC

(57) ABSTRACT

A transmission includes a first transmission stage, a feedthrough extending through the first transmission stage, and a first deflector designed to deflect a lubricant away from the feedthrough.

16 Claims, 5 Drawing Sheets

TRANSMISSION AND METHOD FOR OPERATING A TRANSMISSION

CROSS-REFERENCES TO RELATED APPLICATIONS

This application is the U.S. National Stage of International Application No. PCT/EP2022/052520, filled Feb. 3, 2022, which designated the United States and has been published as International Publication No. WO 2022/179818 A1 and which claims the priority of German Patent Application, Serial No. 10 2021 201 875.0, filed Feb. 26, 2021, pursuant to 35 U.S.C. 119(a)-(d).

BACKGROUND OF THE INVENTION

The invention relates to a transmission and to a method for operating a transmission. The transmission is coupled in particular to an electric machine. The electric machine is a motor or a generator. The transmission is located, for example, in a heavy machinery drive train for a wind turbine or a mill for, e.g. ores or cement.

Greater system integration of the wind turbine transmission with the generator means that the requirements regarding the tightness of the transmission increase. For example, the sealing of the pitch tube with respect to the generator is particularly critical since oil emerging here can damage the generator.

In the case of conventional transmission designs, there is an axial space between each sun and the closest rotor-side component. Trapped oil from the intermeshing of the running gears is pressed into said space and runs axially via the pitch tube, because of the inclination of the transmission, in the direction of the generator.

In the case of integrated concepts, the pitch tube can be mounted radially in the generator. This causes the shielding effect of the bearing on the pitch tube to cease, and the trapped oil from the running gears of the planetary stages is conducted directly in front of the seal to the generator.

In the case of non-integrated concepts, the axis of the pitch tube and generator is not coaxial. In this case, the pitch tube is mounted in the transmission housing. The bearing additionally takes on here the function of the oil shielding effect. The pitch tube is sealed to the outside e.g. by a simple labyrinth seal.

EP 2 541 058 B1 discloses a drive system which has a transmission unit comprising at least one planetary gear stage. The planetary gear stage here has an internal gear, a plurality of planetary gears, a planet carrier and a sun gear. A pitch tube which extends axially over the entire drive system is arranged within an output shaft and a rotor hollow shaft.

DE 10 2019 207 102 A1 discloses a sealing concept for a rotary feedthrough of a vertically oriented transmission, in which outside a bearing for a pitch tube a collecting trough is provided for lubricant oil dripping from the bearing in the axial direction of gravity.

It is an object of the invention to specify a protective system for deflecting trapped oil from the pitch tube.

SUMMARY OF THE INVENTION

The object is achieved by a transmission as set forth hereinafter and by a method as set forth hereinafter. Preferred embodiments are indicated in the dependent claims and the description below which each individually or in combination can constitute an aspect of the invention. If one feature is depicted in combination with another feature, this serves only for simplified illustration of the invention and is not intended in any way to mean that this feature cannot also be a development of the invention without the other feature.

An embodiment of the invention relates to a transmission, in particular for a wind turbine, having at least one first transmission stage, wherein the transmission has a feedthrough, wherein a first deflector is provided for deflecting a lubricant away from the feedthrough.

The transmission is in particular oriented substantially horizontally. The transmission is provided preferably for a wind turbine. In the designated installation position, the substantially horizontally oriented transmission is oriented at a slight angle with respect to the horizontal, that is to say by approx. 2° to 15°, in particular 3° to 10°, particularly preferably 4° to 5°. The at least one deflector can be designed to prevent lubricant, in particular trapped oil, from reaching the feedthrough. For this purpose, the deflector can be arranged at least with a part of the deflector in a path produced between an outlet point of the lubricant and the feedthrough. Without the deflector, lubricant could drip from the outlet point of the lubricant in the direction of gravity onto the feedthrough because of a slight oblique position of the transmission with respect to the horizontal. Since the deflector can be provided in the direction of gravity between the outlet point of the lubricant and the feedthrough, the dripping lubricant, driven by the effect of gravity, can be caught and removed by the deflector. This makes use of the finding that, when the transmission is in a slight oblique position, as is the case in particular when it is used in a wind turbine, in contrast to a purely horizontal orientation of the transmission the surface tension of the lubricant may not be sufficient that the lubricant remains adhering to the components of the outlet point because of adhesion forces caused by the surface tension, and can be removed there, and instead can be detached driven by gravity and can drip. In contrast to a purely vertically oriented transmission, the lubricant also does not drip past the feedthrough, but rather would strike against the feedthrough because of the direction of gravity, which is angled with respect to the orientation of the feedthrough, without a deflector which prevents this.

In particular, a second deflector is provided for deflecting the lubricant away from the feedthrough. The first deflector and the second deflector are preferably provided at different axial ends of the transmission and/or at different axial ends of the at least one transmission stage of the transmission. Particularly preferably, the first deflector is provided at a first end of the feedthrough and the second deflector at a second end of the feedthrough facing away in the axial direction from the first end. This makes it possible to avoid lubricant from being able to penetrate the openings of the feedthrough that are provided in the axial ends.

Preferably, the first deflector and/or the second deflector is/are arranged on one end side of the transmission and/or on one end side of a transmission stage of the transmission.

In an embodiment of the transmission, the transmission has at least one second transmission stage, wherein the first deflector and/or the second deflector is/are provided for deflecting lubricant between the first transmission stage and the second transmission stage.

In an embodiment of the transmission, the first deflector and/or the second deflector is/are connected fixedly to a sun gear.

In an embodiment of the transmission, the first deflector and/or the second deflector has/have a circular arc shape.

In an embodiment of the transmission, the first deflector and/or the second deflector has/have a channel.

In an embodiment of the transmission, the first deflector and/or the second deflector has/have compensation for an inclination of the transmission.

In an embodiment of the transmission, the first deflector and/or the second deflector projects/project into the circular recess, wherein the at least one deflector and the circular recess are arranged rotatably with respect to each other.

In an embodiment of the transmission, the first transmission stage has a planetary transmission, wherein the transmission in particular has an oil sump, wherein the feedthrough in particular is a pitch tube.

In an embodiment of the transmission, the first deflector and/or the second deflector has/have an electrically insulating material.

The invention furthermore relates to the use of a transmission, which can be designed and developed as described above, in an installation position angled with respect to a main axis of rotation of the transmission by 2° to 15°, in particular in a wind turbine. A main axis of rotation is understood as meaning an axis of rotation of the transmission corresponding to the axial direction, in particular an axis of rotation of a sun gear shaft connected to a sun gear.

The invention furthermore relates to a wind turbine having a transmission which is mounted angled with respect to the horizontal by 2° to 15° and which can be designed and developed as described above. The wind turbine can be designed and developed as explained above with reference to the transmission.

The invention furthermore relates to a method for operating a transmission which can be designed and developed as described above, wherein the first deflector and/or the second deflector deflect/deflects lubricants away from the feedthrough. The method can be designed and developed as explained above with reference to the transmission.

In an embodiment of the method, the lubricant is trapped oil.

In an embodiment of the method, lubricant deflected by the deflector is conducted into an oil sump.

In an embodiment of the transmission, mounting of the pitch tube in the transmission is possible. The pitch tube is a feedthrough. Furthermore, no further tightness requirements arise.

In an embodiment of the method, the transmission is connected to an electric machine, wherein the feedthrough is kept free from the lubricant.

BRIEF DESCRIPTION OF THE DRAWING

The present invention will be explained in more detail below by way of example with reference to drawings, in which.

DETAILED DESCRIPTION OF PREFERRED EMBODIMENTS

Figure 1:
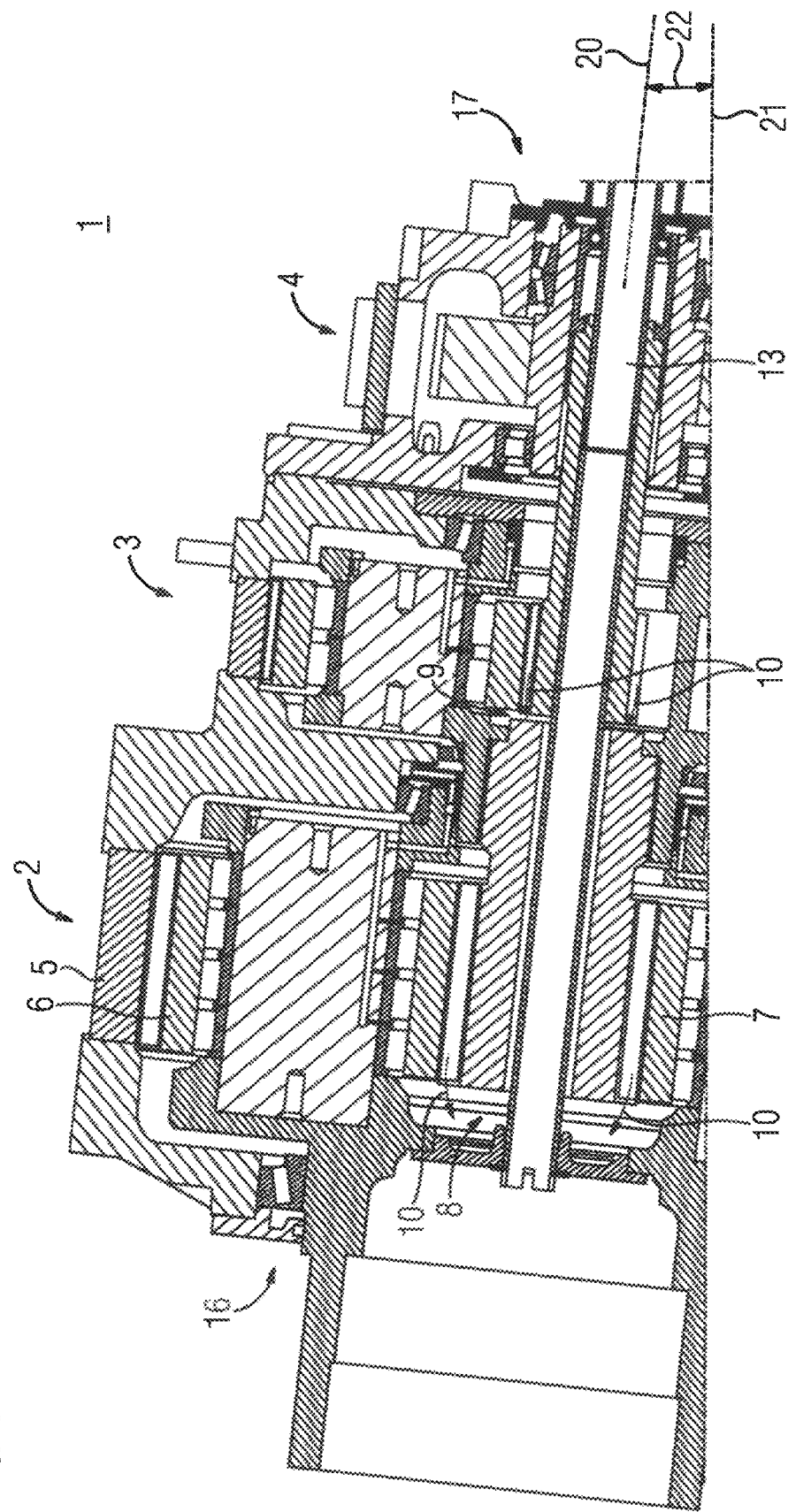
FIG. 1 shows a transmission in a sectional illustration.

The illustration according to FIG. 1 shows a transmission 1 with transmission stages 2, 3 and 4. The transmission 1 has end sides 16 and 17. A feedthrough 13, also called pitch tube, leads through the transmission 1. The axis 20 of the pitch tube has an inclination 22 with respect to a horizontal 21.

The transmission stages 2 have an internal gear 5, planetary gears 6 and sun gears 7. There are cavities, an axial space LSS 8 and an axial space IMS 9. Trapped oil enters said spaces, this being indicated by arrows 10.

Figure 2:
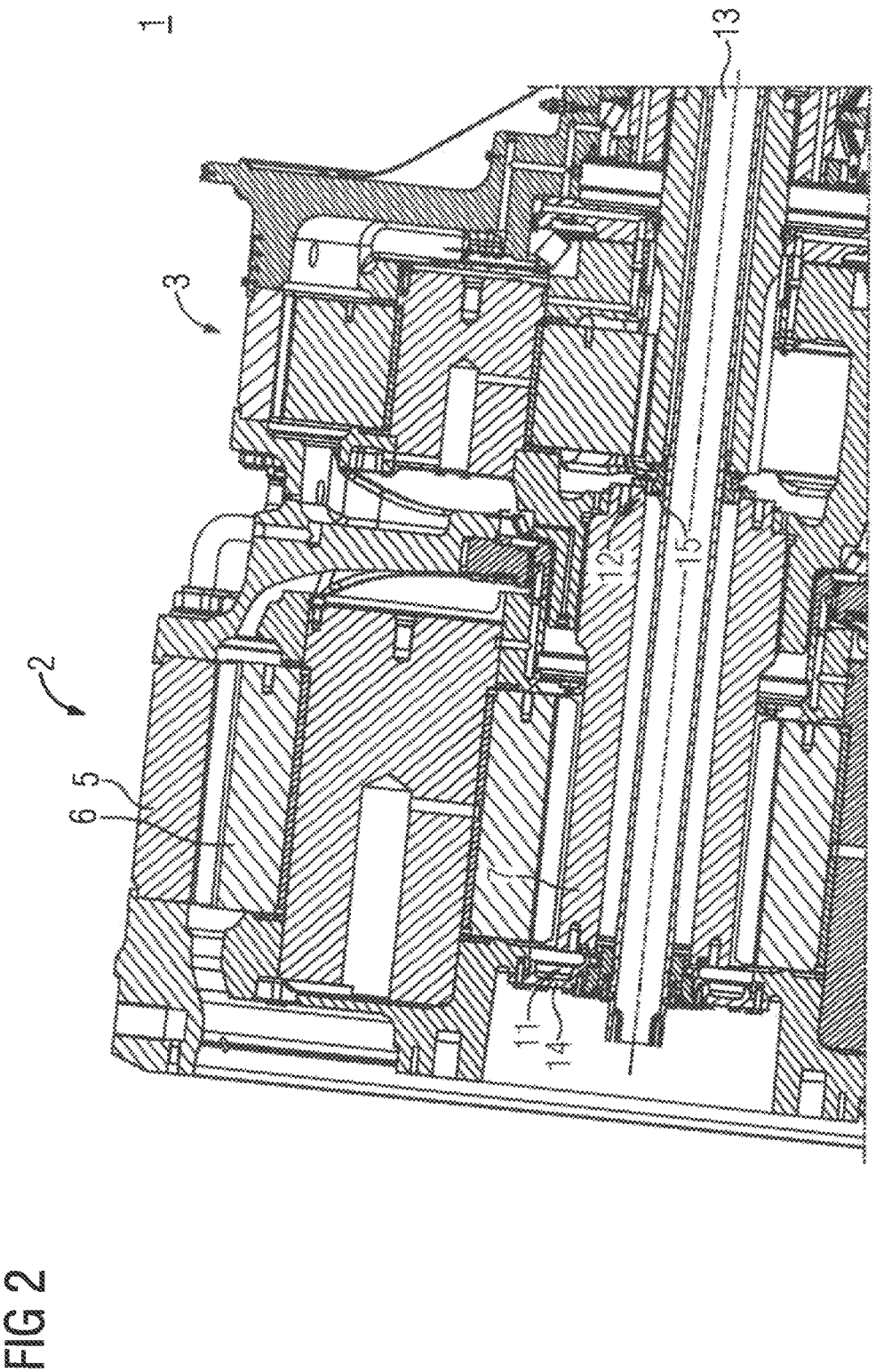
FIG. 2 shows a further transmission in a sectional illustration.

The illustration according to FIG. 2 shows a further transmission with transmission stages 2 and 3, wherein a first shielding system 11 and a second shielding system 12 are provided here. The shielding systems have deflectors 14 and 15. The deflectors deflect trapped oil. It is therefore possible for the pitch tube to remain free from trapped oil. An integrated protective system for deflecting trapped oil from the pitch tube is produced. In the case of this system, there is in particular a radially encircling deflection of oil between each sun and the closest rotor-side component. This shielding reduces the free space in front of the running gear. Most of the oil is therefore conducted directly into the oil sump. Shielding is configured in such a manner that there is an axial overlap with the sun, or the closest axially positioned component. By this means, the oil cannot pass directly onto the pitch tube. The shielding can be screwed to the sun, to the next closest component, or can be a geometrical part of the component or of the sun. A multiple shielding over different diameters is possible.

Figure 3:
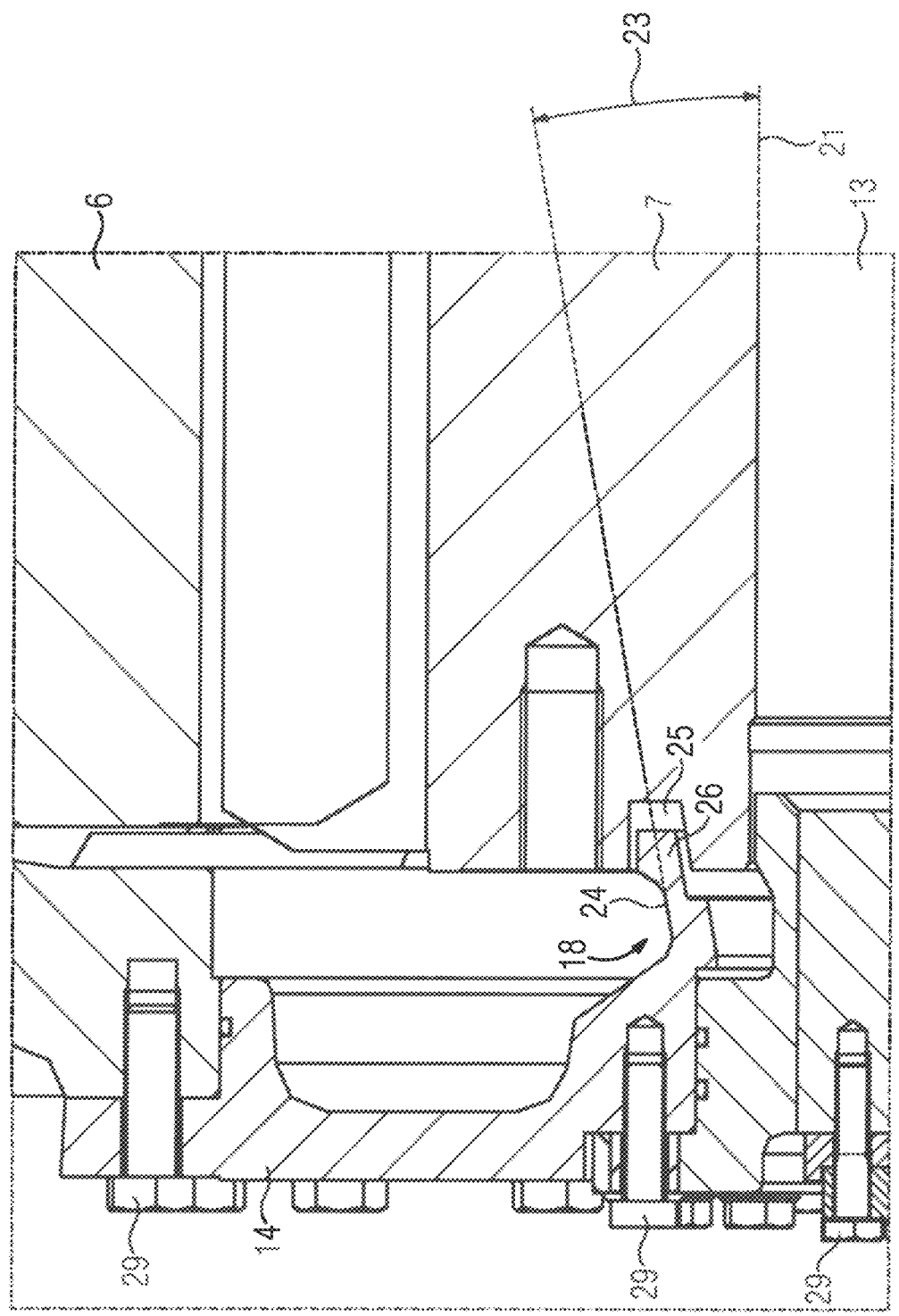
FIG. 3 shows a detail of the further transmission.

The Illustration according to FIG. 3 shows a detail of the further transmission. The deflector 14 is fastened by screws 29. The deflector 14 has a channel 18 with an oblique channel base 24. Therefore, for example, an oblique installation of the transmission can be compensated for. The channel base 24 has an inclination 23 with respect to the horizontal 21. The deflector 14 has a rim 26 which projects into a space 25 in the sun gear 7.

Figure 4:
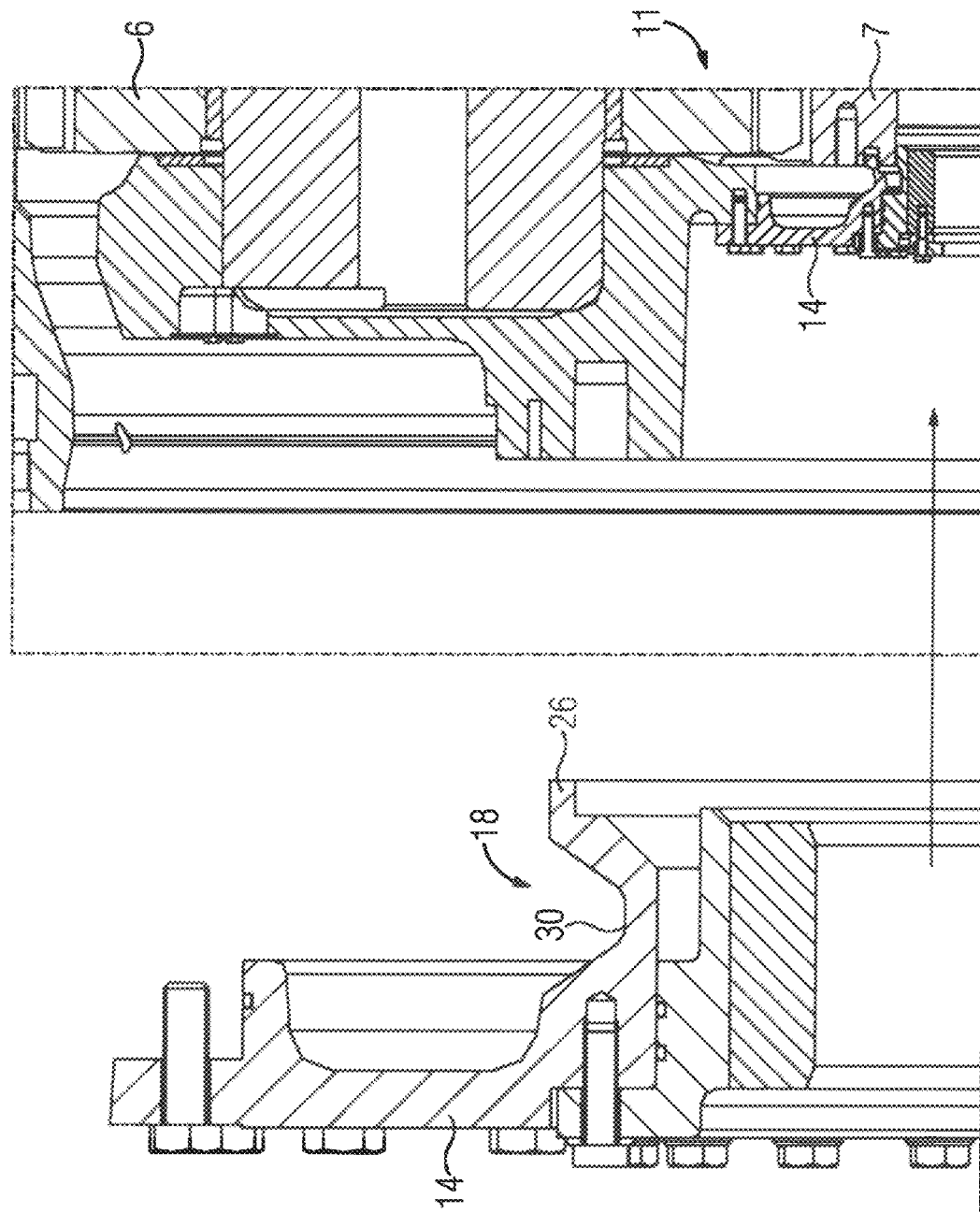
FIG. 4 shows a further detail of the further transmission.

The illustration according to FIG. 4 has a further detailed illustration of the deflector 14. An approximately horizontal channel base is shown here by way of example.

Figure 5:
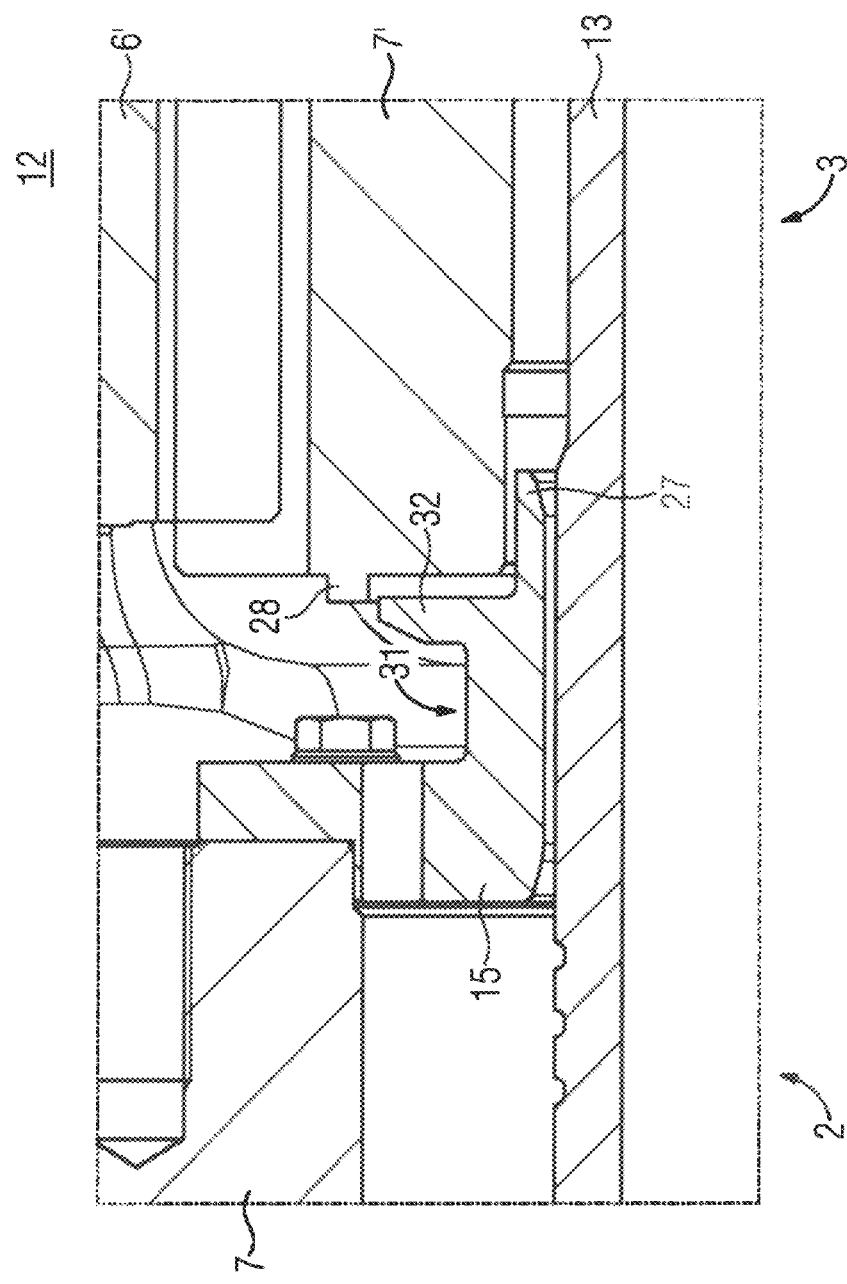
FIG. 5 shows a third detail of the further transmission.

The Illustration according to FIG. 5 shows a further detail of the further transmission. It illustrates a second shielding system which is located in a region between the sun gear 7 and the sun gear 7'. Oil can also accumulate here in a channel 31. The channel is located in a deflector 15. The deflector 15 has a rim 27 which projects between the sun gear 7' and the pitch tube 13. The deflector 15 also has a rim 32 which is at least partially located under an overhang 28 of the sun gear 7'. Trapped oil can thus slide from the sun gear 7' via the overhang 28 and the rim 32 into the channel 31.

The invention claimed is:

1. A transmission, comprising:
   a first transmission stage including a planetary transmission and designed for installation in an installation position that encloses a non-zero angle with respect to a main axis of rotation of the transmission;
   a pitch tube extending through the first transmission stage parallel with the axis of rotation;
   an oil sump; and
   a first deflector having a rim which guides trapped oil from the first transmission stage in a direction of gravity into a circular channel away from the pitch tube into the oil sump.

2. The transmission of claim 1 for installation in a wind turbine.

3. The transmission of claim 1, further comprising a second deflector designed to deflect the lubricant away from the pitch tube.

4. The transmission of claim 3, wherein at least one of the first deflector and the second deflector is arranged on one end side of the transmission.

5. The transmission of claim 3, further comprising a second transmission stage, wherein at least one of the first deflector and the second deflector is designed to deflect the lubricant between the first transmission stage and the second transmission stage.

6. The transmission of claim 3, wherein the first transmission stage comprises a sun gear, said at least one of the first deflector and the second deflector being connected fixedly to the sun gear.

7. The transmission of claim 3, wherein at least one of the first deflector and the second deflector has a circular arc shape.

8. The transmission of claim 3, wherein at least one of the first deflector and the second deflector has a channel.

9. The transmission of claim 3, wherein at least one of the first deflector and the second deflector has a compensation for an inclination of the transmission.

10. The transmission of claim 3, wherein at least one of the first deflector and the second deflector projects into a circular-arc-shaped recess, with the at least one of the first deflector and the second deflector and the circular recess being arranged rotatably with respect to each other.

11. The transmission of claim 3, wherein at least one of the first deflector and the second deflector has an electrically insulating material.

12. The transmission of claim 1, wherein the non-zero angle is between 2° and 15°.

13. A method for operating a transmission which comprises a first transmission stage, a pitch tube extending through the first transmission stage parallel with in an installation position that encloses a non-zero angle with respect to a main axis of rotation of the transmission; a pitch tube extending through the first transmission stage parallel with the axis of rotation, an oil sump, and a first deflector, said method comprising installing the first transmission in an installation position that encloses a non-zero angle with respect to a main axis of rotation of the transmission; and deflecting with a first deflector having a rim trapped oil from the first transmission stage in a direction of gravity into a circular channel away from the pitch tube into the oil sump.

14. The method of claim 13, further comprising connecting the transmission to an electric machine such that the trapped oil is deflected away from the pitch tube by the first deflector.

15. The method of claim 13, further comprising deflecting the trapped oil away from the pitch tube by a second deflector of the transmission.

16. The method of claim 15, further comprising deflecting the trapped oil by at least one of the first deflector and the second deflector between the first transmission stage and a second transmission stage of the transmission.

\* \* \* \* \*